United States Patent Office 3,475,277
Patented Oct. 28, 1969

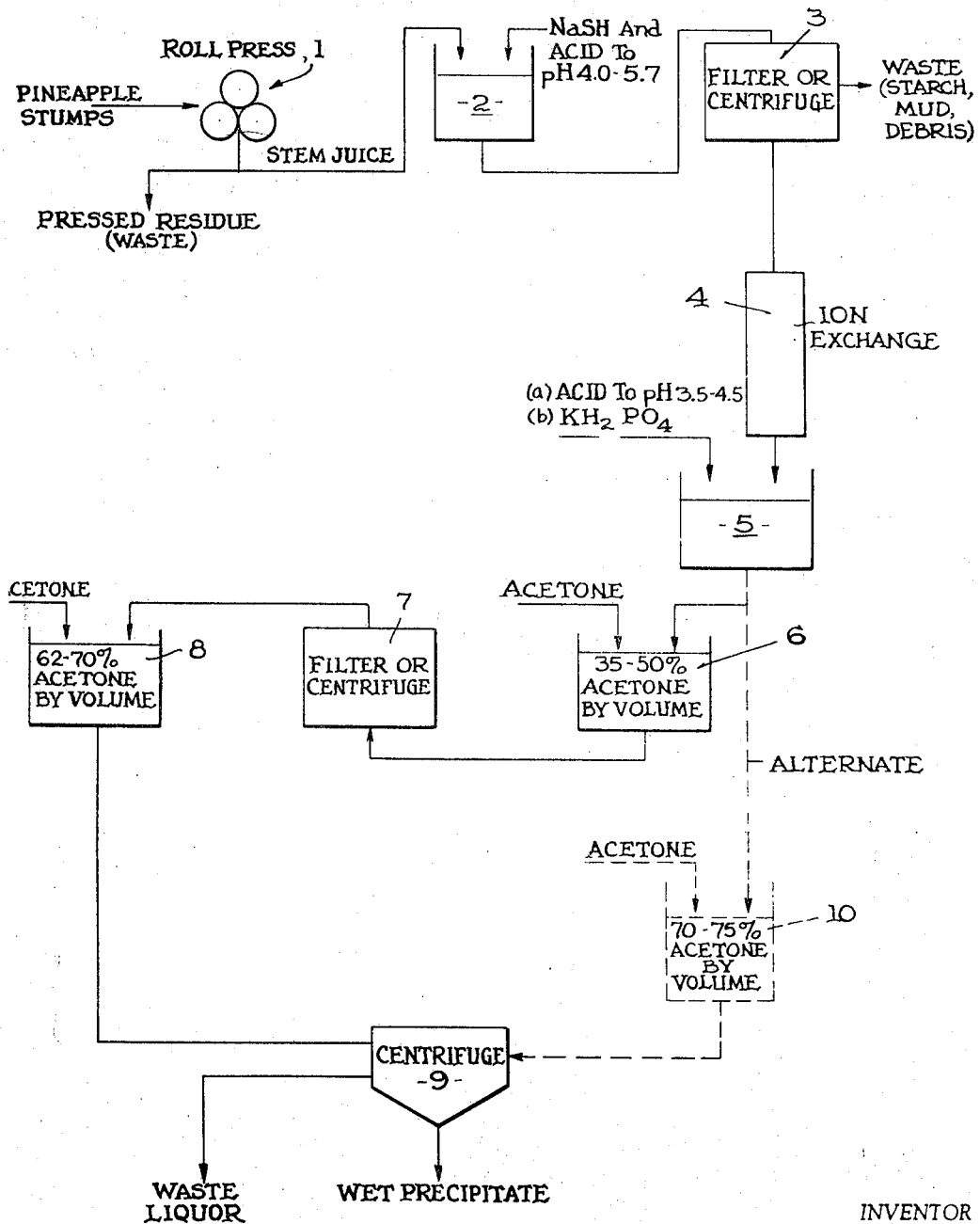

3,475,277
ION EXCHANGE TREATMENT OF BROMELAIN
Ralph M. Heinicke, Honolulu, Hawaii, assignor to Castle & Cooke, Inc., Honolulu, Hawaii, a corporation of Hawaii
Filed Apr. 14, 1967, Ser. No. 631,085
Int. Cl. C12d 13/10
U.S. Cl. 195—66                                    6 Claims

ABSTRACT OF THE DISCLOSURE

Production of low ash, high specific activity bromelain by ion exchange adsorption of impurities from a bromelain solution followed by precipitation of purified bromelain from the solution and drying.

---

This invention relates to an improved process for the production of a proteolytic enzyme preparation from the stem of the pineapple plant of the family "Bromeliaceae," and more particularly the cultivated varieties thereof belonging to the species "*Ananas sativus*." Such preparations are usually referred to as "pineapple stem bromelain" or more simply as "stem bromelain." They comprise primarily a mixture of at least five proteases including bromelain, along with a wide variety of other enzymes as disclosed in my prior U.S. Patents Nos. 3,002,981 granted Oct. 3, 1961 and 3,293,143 granted Dec. 20, 1966. Other enzymes that have been identified include two acid phosphatases, two peroxidases, alpha and beta amylases, cellulases, and a number of specific dehydrogenases.

As set forth in the aforesaid prior patents, particularly No. 3,002,891, the production of stem bromelain typically comprises crushing or pressing the stems, with the addition of maceration water; treating the juice thus obtained with a suitable reducing agent to improve and stabilize the proteolytic activity of the juice, for example, hydrogen sulfide, sulfur dioxide, soluble sulfide salts such as sodium, calcium or ammonium sulfide, sodium sulfhydrate, a bisulfite salt, or hydroxylamine; adjusting the pH of the juice to a value suitable for precipitation, usually in the range of 3.5 to 5.5; and adding a precipitant which does not denature or inactive the enzyme and does not contribute toxic or other undesirable properties to the finished product, for example, low dielectric water-soluble organic solvents such as acetone, methyl ethyl ketone, methanol, ethanol and isopropanol, water-soluble salts such as ammonium sulfate and sodium chloride, etc.; separating the precipitated material by filtration, centrifugation or the like; and then drying the separated material. Typically, stem bromelain powders produced in this way have compositions illustrated by the following table:

TABLE 1

Composition and properties of bromelain powders prepared according to Patent 3,002,891

| | | |
|---|---|---|
| Protease activity | GDU [1] per g | 300–2200 |
| Acid phosphatase activity | APU [2] per g | 100–600 |
| Inorganic material | percent | 20–60 |
| Ca | mg./g | 2–54 |
| K | mg./g | 3–58 |
| Na | mg./g | 5–500 |
| Mn | mg./g | 4–8 |
| Fe | mg./g | 0.1–4 |

[1] One GDU represents the weight of enzyme which will liberate 1 mg. of amino nitrogen from one gram of gelatin at 45° C. in 20 minutes.
[2] One APU (PNP) represents the weight of enzyme which will liberate 1 micromole of p-nitrophenol from p-nitrophenol phosphate at pH 6.0 at 37.5° C. in one minute of time.

The wide variation of properties and composition of such powders make it necessary for the producer, before selling the product, to blend together various batches to produce a blend having a protease activity and an ash level which falls within prescribed ranges. For certain food and pharmaceutical applications, and also for a greater range of blending stocks, the producer needs to be able to prepare bromelain preparations with either little or no ash or else ash of uniform composition. To a certain extent, the amount of ash can be reduced by dialysis of the juice before precipitation, but even very extensive dialysis will not reduce the ash level below 4%.

The present invention resides in an improvement of the above prior methods which comprises subjecting the juice, prior to precipitation and at a pH in the range of 4.0 to 5.7, to ion exchange to replace the cations present in the juice in the form of impurities with selected monovalent cations, thereby controlling the ash content of the final product and unexpectedly increasing both the specific activity and the recovery of the enzyme as set forth in detail below.

A typical process embodying the invention is illustrated schematically by the accompanying flow sheet. The pineapple stems or stumps, gathered and brought in from the fields in any desired manner, are fed to a suitable roll press 1 such as described in my prior Patent 3,002,891. The pressed residue from the roll press is usually discarded. The stem juice passes to a suitable vessel 2 where the desired reducing agent is added, sodium sulfhydrate being indicated in the present case. At the same time it is desirable to adjust the pH of the juice to a value in the range of 4.0 to 5.7 in prepartion for the subsequent step of filtration or centrifugation at 3. The precipitate, comprising waste material such as starch, mud, debris, etc. is discarded.

At this point in the aforesaid prior process, a precipitant such as acetone is added. In processes embodying the present invention, however, the ion exchange treatment referred to above takes place at this point. As shown in the flow sheet, the supernatant liquor from the filtration or centifugation step 3 passes to a suitable ion exchange column or like unit 4, the operation of which is described in greater detail hereinafter. The purified liquor leaving the ion exchange unit 4 passes next to a suitable vessel 5 in which it may be desirable to readjust the pH to a value in the range of 3.5 to 4.5. At the same time it may also be desirable to add certain additives such as potassium dihydrogen phosphate for a purpose explained hereinafter.

The next phase of the process, i.e., precipitation of the enzyme by means of acetone or the like as described in my prior patent, may comprise two successive precipitations, or alternatively a single precipitation, the wet precipitate being eventually dried, ground, blended if desired, and packaged or otherwise stored for distribution and sale. The accompanying flow sheet illustrates the more refined two-step precipitation process in solid lines and the alternative simpler one-step in dotted lines. Referring first to the two-step method, the liquor or juice from the vessel 5 passes to a vessel 6 where it is diluted with acetone amounting to 35–50% by volume of the juice. This serves to precipitate most of the undesired impurities, while leaving the greater part of the enzymatic material in solution. The precipitate, which is collected by filtration or centrifugation at 7, has relatively little enzymatic activity and is usually discarded, and the supernatant passes to a vessel 8 where additional acetone is added to increase the total acetone to 62–70% by volume of the juice. This further dilution serves to precipitate the enzymatic material, now relatively pure, which is collected and separated from the remaining juice preferably by centrifuging at 9 after which the wet precipitate is treated as already described or in any other desired manner.

Alternatively in the simpler one-step procedure, the liquor from the vessel 5 passes to a suitable vessel indicated in dotted lines at 10 in which it is diluted with the desired precipitant such as acetone in the amount of 70–75% by volume of the liquor. This dilution precipitates not only the enzymatic material but also a group of natural maltose polymers remaining in the juice, all of which are separated by the centrifuge 9 as a wet precipitate which is then dried, ground, etc. The maltose polymers help to increase the solubility of the finished product.

As already indicated, control of the pH of the solution is important throughout the process, and it is also desirable in order to achieve maximum yields of good quality enzymes to effect rapid handling of the juice. It will be understood from the flow diagram already described that the pH range most desirable for filtration at 3 and ion exchange at 4 differs from the pH range that is best for enzyme precipitation at 8 or 10. There is an overlap between the two ranges and a substantially constant pH in this overlapping range may be maintained throughout the process, but for best results two adjustments of pH as indicated by the flow diagram are preferred. Pineapple stem juice contains a number of relatively insoluble calcium organic polymers, which can be removed at various points. If the pH of the juice is adjusted at 2 to a low value in the range 4.0–5.0, before it is filtered or centrifuged at 3, then most of these organic polymers remain soluble and pass through the filter but precipitate out in the ion exchange unit. This precipitate is soluble in base; it can also be removed from the column by back-washing prior to regeneration of the column.

However, if the pH of the juice is adjusted to a high value in the stated range, say 5.5, then some of these calcium organic polymers become insoluble and are separated from the juice at 3. Accordingly, the precipitate in the ion exchange unit 4 is less and the regeneration of the column is a simpler operation. This is an important practical consideration in many cases which outweighs the accompanying disadvantage of having to readjust the pH at 5 to the value desired for precipitation of the enzyme.

On the other hand, the activity and amount of the enzyme recovered may be adversely affected by the use of a high pH value. In general, if all of the operations are carried out at pH $4.0 \pm 0.2$ the enzyme is most stable and the recovery of enzymes is greatest. It is therefore most important that if the pH is adjusted to 5.5 for filtration and ion exchange, these operations be carried out as expeditiously as possible in order to minimize potential losses of enzymes at this relatively high pH; also immediately after the ion exchange treatment is completed, the juice should be readjusted to a lower pH in the range of 3.5 to 4.5, say pH 4.0.

The following table illustrates the effects obtained at different pH values for filtration and precipitation, both under the standard treatment of prior Patent No. 3,002,891 and with the ion exchange procedure of the present invention.

TABLE 2.—EFFECT OF THE pH OF THE FILTRATION AND THE PRECIPITATION STEPS ON THE RECOVERY AND PROPERTIES OF ENZYME MADE BY THE STANDARD METHOD OR BY PASSING THE JUICE OVER A CATION EXCHANGE RESIN (DUOLITE C-25) IN THE $NH_4$ FORM

| Treatment | pH of filtering | Properties of the Juice | | | pH which the enzyme was precipitated | GDU | | Percent insoluble | pH of a 1% sol'n | Color** |
|---|---|---|---|---|---|---|---|---|---|---|
| | | GDU/ml. | Biuret color | APU/ml. | | Per g. | 100/ml.* | | | |
| Standard | 3.8 | 11.2 | 1.29 | 8.4 | 3.8 | 1,015 | 588 | 6.2 | 6.0 | 13 |
| Do | 5.8 | 10.15 | 0.94 | 6.5 | 5.8 | 700 | 441 | 1.9 | 6.6 | 44 |
| Ion Exchange | 3.8 | 7.70 | 1.02 | 8.9 | 3.8 | 1,890 | 538 | 8.9 | 3.9 | 27 |
| Do | 5.8 | 8.40 | 0.92 | 6.8 | 3.9 | 1,855 | 621 | 11.9 | 4.2 | 28 |
| Do | 5.8 | 8.40 | 0.92 | 6.8 | 5.9 | 1,610 | 538 | 13.2 | 4.2 | 46 |

\* Yield of enzyme activity as a dry powder from 100 ml. of juice.
\*\*These figures refer to the Klett color units at 620 mμ of a 1% solution of enzyme which had been adjusted to pH 7.0 and held for 24 hours.

With regard to the ion exchange treatment, the desired monovalent cations are the sodium, potassium and ammonium cations, all of which produce enzyme preparations that are superior to the "Standard" enzyme (produced according to Patent No. 3,002,891) in total recovery, specific activity, and solubility. These results are illustrated by the following tables with respect to $NH_4^+$ and $Na^+$.

TABLE 3.—COMPARISON OF THE QUALITY OF ENZYME PRODUCED BY THE STANDARD PROCEDURE AND BY ION EXCHANGING ON $NH_4^+$ OR $Na^+$ "C-20" COLUMNS

| Juice Treatment | GDU | | Percent insoluble | pH of a 1% solution | Percent ash |
|---|---|---|---|---|---|
| | Per gm. | Per 100 ml.* | | | |
| Standard | 245 | 140 | 11.9 | 5.8 | 49.6 |
| $NH_4$ C-20 | 1,155 | 200 | >27.0 | 4.9 | 2.0 |
| Na C-20 | 455 | 220 | 3.8 | 6.2 | 48.0 |

\* Yield of enzyme activity in a dry powder form from one liter of juice.

TABLE 4.—COMPARISON OF THE ENZYMES MADE FROM EITHER FILTERED OR FIRST ACETONE SUPERNATANT JUICE WHICH HAD BEEN ION EXCHANGED ON $Na^+$ OR $NH_4^+$ SULFONIC ACID ION EXCHANGE COLUMNS

| Type of Juice | Treatment | GDU | | pH of enzyme (1% solution) |
|---|---|---|---|---|
| | | Per g. | Per 100 ml.* | |
| Filtered juice | Standard | 315 | 693 | 5.80 |
| Do | Duolite C-25 $NH_4$ | 1,050 | 1,050 | 5.30 |
| First acetone supernatant | Standard | 175 | 315 | 5.80 |
| Do | Duolite C-25 $NH_4$ | 1,400 | 840 | 5.30 |
| Do | Duolite C-25 Na | 945 | 945 | 6.00 |

\* Recoveries are based upon the original volume.

Improvements are also effected with regard to the ash content of the enzyme preparation. As shown by Table 3, the total ash content of the preparation is essentially the same in the case of $Na^+$ as in the Standard; the same is true as to $K^+$. In either case, however, the enzyme preparation has a definite known cation which is important for many purposes. On the other hand, $NH_4^+$ is by far the best in producing an enzyme preparation having a high specific activity and very low ash content.

The results stated above are probably explainable in large part by the complex interactions taking place between the organic colloids and the calcium and like ions in the juice. Electrophoretic data show the presence in stem juice of proteins with isoelectric points ranging from 4.5 to 11.5. In a salt rich medium small ions tend to form clouds around these colloids and lessen the interaction of the oppositely charged colloids with each other. Such solutions are completely clear. However, when acetone is added to the solution, the colloids are forced togeter to form a precipitate, the calcium and other ions apparently being trapped and bridging colloid particles together either to make insoluble particles or to cover up the active sites of the enzymes. This theory is supported by the fact that the addition of calcium ions may cause complete blocking of the active sites of the enzyme as illustrated by the following table.

of three classes of cation resins including a carboxylic resin (IRC–84) and two sulfonic acid resins (120 and IRC–200). As shown by the table, there are differences in the recovery of enzymes obtained with these different resin matrices and with the different functional groups and yet all of them produce useful results in one or more respects as compared with the "Standard" method. In particular, one or the other of these different resins may be preferred for activating protease or acid phosphatase and in changing the ratio of one to the other.

TABLE 6.—A COMPARISON OF THE ENZYMES MADE FROM PINEAPPLE JUICE WHICH HAD BEEN ION EXCHANGED AT pH 4.2 ON THREE DIFFERENT CLASSES OF CATION RESINS IN THE $NH_4$ FORM

| Resin | Gms. enzyme, l. of juice | GDU Per g. | GDU Per l.* | A-Pase APU/g. | A-Pase APU/l. | pH of a 1% enzyme solution |
|---|---|---|---|---|---|---|
| "120" Sulfonic | 3.82 | 1,925 | 7,360 | 1,185 | 4,510 | 4.3 |
| IRC 200 Sulfonic | 2.84 | 1,710 | 4,880 | 1,590 | 4,510 | 4.3 |
| IRC 84 Carboxylic | 5.62 | 1,730 | 9,740 | 827 | 4,650 | 4.6 |
| Check (Standard method) | 4.35 | 1,610 | 7,000 | 483 | 2,100 | 6.0 |

*Yield of enzyme activity in a dry powder form from one liter of juice.

In summary, for many purposes the $NH_4^+$ is to be preferred because of the unexpected and unique results TABLE 5.—EFFECT OF CALCIUM CHLORIDE ON THE ACTIVITY OF PINEAPPLE STEM JUICE AND ON THE ENZYME PREPARED FROM SUCH JUICE BY PRECIPITATION AT pH 4.0 WITH ACETONE

| Juice | | | Acetone Precipitated Enzyme | | | |
|---|---|---|---|---|---|---|
| Salt Added to the Juice | GDU/ml. | Type of Acetone Precipitation | GDU/g. | GDU/ 100 ml.* | APU/g. | APU/ 100 ml. |
| Test I: | | | | | | |
| 1% NaCl | 8.5 | Double Precipitation [1] | 595 | 392 | 2.80 | 184 |
| 1% $CaCl_2$ | 9.2 | do | 315 | 96 | 307 | 91 |
| 1% $CaCl_2$ | 9.2 | Single Precipitation [2] | 0 | 0 | 0 | 0 |
| Test II: | | | | | | |
| 1% NaCl | 27.0 | do | 1,610 | 2,160 | 315 | 426 |
| 1% $CaCl_2$ | 27.3 | do | 105 | 155 | 9 | 12 |

*This represents the total dried enzyme activity recovered from 100 ml. of pineapple stem juice.
[1] First precipitation step: 50 ml. acetone to 100 ml. of juice. Second precipitation step: 120 ml. acetone to the supernatant of #1.
[2] 170 ml. of acetone to 100 ml. of juice.
NOTE.—Test I results obtained with low quality juice and Test II results with high quality juice.

For optimum recovery of enzyme activity by acetone precipitation it thus appears desirable to eliminate all calcium and other polyvalent cations by ion exchange treatment; but complete removal of all ions, as for example by the ammonium ion exchange process, causes other problems. In an ion free solution, when acetone is added to precipitate the protein, the solution, when acetone is added to precipitate the protein, the oppositely charged colloids precipitate together. Later when the precipitate is dried, the electrostatic attraction between these oppositely charged colloids keeps them together. Such preparations show poor solubility (see for example the $NH_4$ ion exchanged samples in Tables 2, 3 and 8). Methods for compensating for such reduced solubility are discussed hereinafter.

Broadly speaking, any suitable monovalent cation ion exchange resin can be employed for the purposes of the present invention, the choice of the cation, of course, depending upon the considerations already set forth. The best results have been obtained with resins having carboxylic and sulfonic acid functional groups. In general, any desired matrix can be employed, such as the commonly used cross-linked polystyrene resins. Of course, some minor operational differences are to be expected based on the exchange capacity of the resin and the ease with which it can be cleaned and regenerated.

The following Table 6 illustrates the different effects obtained with this cation. Enzymes made from pineapple stem juice in which all of the cations have been replaced by ammonium ions are practically ash free. The addition of strong alkali to the precipitated enzymes liberates only a small amount of ammonia, indicating that all of the ammonium salts were soluble in the acetone and therefore had been discarded.

Also the enzymes made from ammonium exchanged stem juice are appreciably different from both the "Standard" enzymes and the enzymes made from juice whose cations have been replaced by sodium. In general, the weight yield from the ammonium exchanged juice tends to be lower but the specific activity of the enzyme is higher and the acid phosphatase level has been found to be the highest of any preparation made according to the invention. Other differences are that the pH of the ammonium exchanged enzyme solution is lower and that its solubility always tends to be lower.

The ash level of enzymes produced according to the present invention, and particularly of the ammonium exchanged enzymes, is of special interest for many purposes for which these enzymes can be used. As to the ammonium exchanged enzymes, the following table shows not only the high activity of the ammonium exchanged enzymes but also that the total ash content of the enzymes is consistently 1% or less.

TABLE 7.—COMPARISON OF THE SPECIFIC ACTIVITY, ASH CONTENT AND RECOVERY OF BROMELAIN FROM PINEAPPLE STEM JUICE BY THE STANDARD TECHNIQUE AND BY AMMONIUM ION EXCHANGE TREATMENT OF THE JUICE

|  |  | GDU | | Percent | | | |
|---|---|---|---|---|---|---|---|
|  | Method | Per g. | Per 100 ml.* | Protein | Total ash | Ca | pH |
| Quality of Juice: | | | | | | | |
| Poor | Standard | 525 | 375 | 24.0 | 44.0 | 16.7 | 6.0 |
|  | NH₄ exchange resin | 1,650 | 563 | 74.4 | 1.0 | 0.0 | 4.0 |
| Fair | Standard | 600 | 420 | 28.8 | 42.2 | 13.5 | 5.9 |
|  | NH₄ exchange resin | 2,100 | 576 | 80.4 | 1.0 | 0.01 | 4.1 |
| Good | Standard | 1,085 | 880 | 34.8 | 22.0 | 8.2 | 5.8 |
|  | NH₄ exchange resin | 2,205 | 880 | 70.0 | 0.6 | 0.0 | 4.1 |

*This represents the total recovery of dried enzyme activity from 100 ml. of starting stem juice.

Table 7 also shows that as a general rule, the effectiveness of the invention in increasing the total recovery of enzymes tends to be inversely proportional to the starting quality of the stem juice. With low quality juices in the range of 8–12 GDU/ml., the invention provides the two important benefits of increasing the total recovery of enzymes from a given volume of juice and increasing the specific activity of enzymes as well. With very high quality juices, i.e., those with more than 15 GDU/ml., the total recovery may be decreased somewhat as shown by Tables 2 and 6, probably because some proteins are adsorbed on the precipitate which forms in the ion exchange unit. Nevertheless, Table 7 shows that the specific activity of the ion exchanged enzyme is increased, an important consideration for special pharmaceutical applications and also for blending purposes.

Instead of the reducing agents mentioned in my prior Patent No. 3,002,891 by way of example, it is advantageous in some cases to use certain more or less well known anti-oxidants. However, the action of anti-oxidants is very selective and many of them are unsatisfactory for protection of the enzymes produced by the present invention, while others may be effective but undesirable for use in edible products because of toxic effects. For example, butylated hydroxyanisole (BHA) gives very good results along with the benzoate ion of my prior Patent No. 3,293,143 and the reducing agents of my prior Patent No. 3,002,891.

In addition to BHA, vitamin E and related tocopherols are effective but are too expensive for general use. Various other well known anti-oxidants have proved ineffective or undesirable because of adverse effects on color, deactivation of the enzyme, toxic properties, etc.

The following table illustrates the effectiveness of BHA:

TABLE 8.—EFFECT OF BHA ON THE ACTIVITY OF BROMELAIN STORED AT 70% RELATIVE HUMIDITY AND 25° C.

|  | Percent of Check Activity at— | | |
|---|---|---|---|
|  | Initial | 6 months | 2 years |
| Check (No BHA) | 100 | 6.4 | 0 |
| BHA 0.1% | 113 | 48.6 | 0 |

As previously indicated, the ion exchange treatment sometimes results in decreased solubility of the enzyme prepaartion, with an accompanying loss in activity. When this occurs, principally in the case of $NH_4^+$, the disadvantage can be reduced in either of two ways, i.e., by increasing the concentration of acetone used for the final precipitation step, or by adding certain solubilizing materials.

In the first method, the increased acetone concentration precipitates with the enzymes part of the non-protein colloids present in the juice. This results in a substantial increase in the solubility of the enzyme preparation. As illustrated in Example 5 hereinafter, the solubility is increased from less than 83% to over 92% by increasing the final concentration of acetone to 70.6% by volume. In the second method, materials can be added either to the juice before precipitation or to the wet acetone precipitant so as to increase the solubility of the final preparation. One of the best materials for this purpose is $KH_2PO_4$, which is precipitated almost quantitatively at about the same acetone concentration as is the enzyme. The effect of adding $KH_2PO_4$ on total recovery, solubility, and percent ash is illustrated in the following table.

TABLE 9.—EFFECT OF PHOSPHATE ADDED TO STEM JUICE WHICH HAD BEEN ION EXCHANGED ON C-20-$NH_4^+$ RESIN*

|  |  |  | GDU | | | | | |
|---|---|---|---|---|---|---|---|---|
|  | Percent $KH_2PO_4$ | pH of juice | Per g. | Per 100 ml. | Percent recovery | Percent insoluble | Percent ash | APU, per mg. |
| Treatment: | | | | | | | | |
| Standard | 0 | 4.5 | 525 | 440 | 52.5 | 4.1 | 43.6 | 0.325 |
| RESA** | 0 | 3.5 | 1,725 | 550 | 73.5 | 15.5 | 1.2 | 1.335 |
| RESA** | 0.5 | 3.5 | 1,120 | 670 | 87.5 | 2.7 | 37.6 | 0.760 |
| RESA** | 1.0 | 3.5 | 875 | 725 | 94.5 | 1.9 | 54.2 | 0.550 |
| RESA** | 1.5 | 3.5 | 525 | 705 | 91.5 | 1.5 | 51.4 | 0.300 |
| RESA** | 2.0 | 3.5 | 420 | 870 | 113.0 | 0.9 | 60.2 | 0.188 |

*The original juice was adjusted to pH 4.5 with $H_3PO_4$ and 0.05% NaSH was added, after which it was filtered through asbestos fiber and diatomaceous earth and subjected to ion exchange. After filtration it contained 840 GDU/100 ml. After ion exchange it contained 770 GDU/100 ml. After ion exchange, the pH was adjusted to the values in the above table for precipitation.
**Resin Exchange Sulfonic Acid Ammonia. This abbreviation describes the standard ammonium ion exchange treatment, using a sulfonic acid resin.

It may be desirable to use sugars such as glucose, fructose, sucrose, sorbose, lactose and the like, instead of $KH_2PO_4$, to improve the solubility of the precipitated enzyme. In general, the addition of one or more such sugars improves both the solubility and the total activity of the precipitated and dried enzyme preparation, but the specific effectiveness of individual sugars may vary somewhat. For example, among the five sugars listed above for purposes of example, fructose, sucrose and sorbose were more effective in improving the total activity of the enzyme preparation, whereas fructose and sorbose gave best results in improving its solubility. The addition of sugars, especially fructose, may cause the enzyme to become somewhat more hygroscopic, but if the precipitate is dried thoroughly, this does not create any difficult problem.

The following examples illustrate various typical embodiments of the invention.

EXAMPLE 1

Single stage acetone precipitation of bromelain from juice which has undergone ion exchange on a sulfonic ammonium ion exchanger.

To two liters of freshly pressed pineapple stem juice were added 1 gm. of 70% NaSH and sufficient $H_3PO_4$ to adjust the pH to 5.4. The juice was immediately filtered with suction through a pad of diatomaceous earth. Ten bed volumes of juice were then passed over a column of Duolite C-25 resin in the ammonium form. The percolate was adjusted to pH 3.8 and the enzyme then precipitated with two volumes of cold acetone and then dried.

Yield=3.2 g. of 1725 GDU/g. enzyme per liter of percolate. The ash was 1.2%, the insolubles 15.5%, and the pH 4.10. The acid phosphatase level was 880 APU/g. (See addendum to Example 2 for the properties of enzyme made by the prior "Standard" method.)

EXAMPLE 2

The effect of added $KH_2PO_4$ in solubilizing the enzyme made from ammonium ion exchanged juice.

The procedure was similar to that of Example 1 except that 5 g. of $KH_2PO_4$ were added to 1 liter of percolate.

Yield=6.0 g. of 1120 GDU/g. enzyme per liter of percolate. The ash was 37.6%, the insolubles 2.7% and the pH 4.10. The acid phosphatase level was 880 APU/g.

In both Examples 1 and 2 the standard procedure of my prior patent gave 8.0 g. of 525 GDU/g. enzyme per liter of filtered juice. The ash was 43.6%, the insolubles 4.1% and the pH 6.0. The acid phosphatase level was 215 APU/g.

EXAMPLE 3

Ammonium ion exchange treatment of the first acetone supernatant.

One liter of the first acetone supernatant solution (e.g., from the preliminary purification step 3 of the flow sheet) was passed over a column of Duolite C-20 resin in the ammonium form. To one volume of percolate was then added an equal volume of cold acetone to precipitate the enzyme which was washed and dried.

Yield=1.70 g. of 1150 GDU/g. enzyme per liter of the first acetone supernatant solution. The ash content was 2% and the insolubles over 27%. The enzyme contained 60% protein as estimated from the biuret color. (See the addendum to example four for the properties of enzyme made by the prior standard method).

EXAMPLE 4

Sodium ion exchange treatment of the first acetone supernatant.

The procedure was similar to Example 3 except that the resin column was converted to the sodium form instead of the ammonium form.

Yield=4.78 g. of 455 GDU/g. enzyme per liter of first acetone supernatant solution. The ash content was 48% and the insolubles 3.8%. The enzyme contained 27% protein as estimated from the biuret color.

In both Examples 3 and 4 the prior standard procedure gave a yield of 5.6 g. of 245 GDU/g. enzyme per liter. The ash content was 49.6% and the insolubles 11.9%. The enzyme contained 17% protein as estimated from the biuret color.

EXAMPLE 5

The use of large amounts of acetone to improve the solubility of the enzyme.

Ten bed volumes of stem juice containing 2 g. of 70% NaSH per liter of juice were filtered at pH 5.5 and passed over a Duolite C-20 column in the ammonium form. The pH of the percolate was adjusted to pH 4.0. The percipitation was carried out in two steps as shown in the flow sheet, the first at an acetone concentration of 44.5% v./v. and the second at 70.6% v./v. This final concentration of acetone is at the upper limit of the range shown on the flow sheet.

Yield=3.5 g. of 1540 GDU/g. enzyme per liter. The ash content was 1.8%, the insolubles 7.6%. The acid phosphatase activity 837 APU/g.

In contrast, when using only 57.5% acetone in the final precipitation, the yield was 3.1 g. of 200 GDU/g. enzyme per liter, and the insolubles 14%.

The principal advantage of this procedure is the better solubility of the enzyme, but it is obtained at the expense of a lower specific activity.

EXAMPLE 6

The use of a carboxylic cation exchange resin. If increased yield is the primary objective, this is one of the resins of choice.

Laboratory pressed pineapple stem juice which contained 2 g. of 70% NaSH per liter and which had a pH of 4.0 was filtered and then passed over an IRC-84 column in the ammonium form. The column had been adjusted to pH 5.5 with $NH_4OH$. The percolate was adjusted to pH 4.0 and a single addition of two volumes of acetone to one of percolate was made to precipitate the enzyme.

Yield=7.04 g. of 1140 GDU/g. enzyme per liter. The ash was 17% and the insolubles 6%.

Thus the yield is high, but this enzyme preparation differs from the other ion exchanged enzymes in having more ash and more inert material. Still the total recovery of enzyme is as good as that obtained by the prior standard procedure and the ash level of the enzyme preparation is lower.

EXAMPLE 7

This example illustrates the improvement in total activity and solubility obtained by the addition of sugar to the precipitated enzymes as already described generally above.

To 10 g. of wet acetone precipitate prepared according to Example 1, 100 ml. of acetone were added. The resulting slurry was centrifuged and the acetone discarded. To the precipitate ½ g. of fructose was added, being worked into the precipitate with a pestle. At this stage the precipitate still contained enough moisture to dissolve the fructose and give a somewhat gummy residue. This gummy residue was placed in a vacuum drier and dried for 24 hours.

As compared with Examples 1 and 2, the results of this Example 7 show that the effect of adding sugar is comparable to that of adding $KH_2PO_4$. The yield in Example 7 was 4.5 g. of 1600 GDU/g. enzyme per liter, the ash was 0.9%, and the insolubles were 6.4%.

It is to be expressly understood that the invention is not restricted to the details of the foregoing description and examples and that reference should be had to the appended claims for a definition of its limits.

I claim:

1. In the production of enzymic materials containing stem bromelain by precipitating the enzyme-containing material from juice expressed from crushed plants of the family Bromeliaceae, the improvement which comprises passing the juice prior to said precipitation in ion exchange relation with an ion exchange resin having one or more exchange cations selected from the group consisting of $NH_4^+$, $Na^+$ and $K^+$, thereby replacing cations naturally present in said juice with said exchange cations and increasing the specific activity of the precipitated enzymic material.

2. The process defined in claim 1, including adjusting the pH of the juice to a value in the range of 4.0–5.7 prior to the ion exchange treatment.

3. The process defined in claim 1, including adjusting the pH of the juice to a value in the range of 3.5–4.5 before precipitation of the enzyme containing material therefrom.

4. The process defined in claim 1, including adjusting the pH of the juice to about 5.5 and then separating insoluble material from the juice prior to ion exchange treatment.

5. The process defined in claim 1 in which the exchange cation is $NH_4^+$, and the precipitating medium is one in which the $NH_4^+$ compounds formed in the juice by ion exchange are soluble, thereby both increasing the specific activity of the precipitated enzymic material and decreasing its ash content.

6. The process defined in claim 5, including the step of adding to the precipitate a solubility improver selected from the group consisting of $KH_2PO_4$ and sugar.

References Cited

UNITED STATES PATENTS 3,293,143   12/1966   Heinicke _____ 195—63

LIONEL M. SHAPIRO, Primary Examiner

PO-1050
(5/69)

UNITED STATES PATENT OFFICE
CERTIFICATE OF CORRECTION

Patent No. 3,475,277      Dated October 28, 1969

Inventor(s) Ralph M. Heinicke

It is certified that error appears in the above-identified patent and that said Letters Patent are hereby corrected as shown below:

Col. 1, line 72, "make" should be --makes--. Col. 5, lines 55-56, "the solution, when acetone is added to precipitate the protein" should be omitted. Table 6, line 1 of the heading, "stem" should be inserted after --pineapple--. Table 6, in the column entitled Per g., "1,710" should be --1,720--. Col. 8, line 18, "preparation" is misspelled. Col. 10, line 8, "200" should be --2000--.

SIGNED AND
SEALED
APR 7 1970

(SEAL)
Attest:

Edward M. Fletcher, Jr.
Attesting Officer

WILLIAM E. SCHUYLER, JR.
Commissioner of Patents